United States Patent [19]

Herrick et al.

[11] Patent Number: 4,796,899
[45] Date of Patent: Jan. 10, 1989

[54] LIQUID-TIGHT SEALING DEVICE AND METHOD

[76] Inventors: Robert S. Herrick, 1065 South East St. Lucie Blvd., Stuart, Fla. 33494; Gary E. Webb, 501 Southeast Capon Ter., Port St. Lucie, Fla. 33452

[21] Appl. No.: 10,267
[22] Filed: Feb. 2, 1987
[51] Int. Cl.[4] ............................................. F16J 15/10
[52] U.S. Cl. ........................................ 277/228; 277/1; 277/237 R; 285/192; 52/169.7; 4/507
[58] Field of Search ...................... 277/1, 228, 237 R; 4/507; 285/192, 200, 915; 126/314; 52/61, 62, 169.7

[56] References Cited

U.S. PATENT DOCUMENTS 1,210,217 12/1916 Schodde ............................... 126/314
4,063,759 12/1977 Steimle .................................. 4/507 X
4,086,736 5/1978 Landrigan ......................... 285/192 X

FOREIGN PATENT DOCUMENTS 2627447 12/1977 Fed. Rep. of Germany .......... 277/1
3104360 8/1982 Fed. Rep. of Germany ...... 285/192
863195 3/1961 United Kingdom ................ 285/192

Primary Examiner—Robert S. Ward
Attorney, Agent, or Firm—Lahive & Cockfield

[57] ABSTRACT

A method and device which provide a liquid-tight seal between a length of pipe, a housing, or other hollow structure and cured concrete in which the structure is embedded. A foamed polymeric sealing element is bonded about a portion of the exterior surface of the structure, and gunnite or concrete is cast about the structure and the sealing element. The interface of the concrete and the foamed polymeric sealing element become substantially permanently sealingly engaged. The method and device are particularly useful in the construction of swimming pools or similar fluid-containing vessels in which pipes or housings penetrate cast walls meant to confine water or other fluids. The method and device may also be used to form seals about structures penetrating cast foundations, dams, bulkheads, retaining walls, cisterns and basement walls.

9 Claims, 2 Drawing Sheets

LIQUID-TIGHT SEALING DEVICE AND METHOD

BACKGROUND OF THE INVENTION

This invention relates to devices and methods for providing liquid-tight seals between a pipe, housing, or other hollow structure, and concrete or other cement-like mixtures in which the structure is embedded. More particularly, it relates to providing liquid-tight seals about structures penetrating spray cast or poured walls of swimming pools, tanks, sewerage containers, dams, retaining walls, basement walls, foundations, and other cementitious castings meant to confine or channel the flow of liquid.

When pools are constructed of concrete, gunnite, other cement-containing compositions or similar curable mixtures, it is often necessary to create holes in the walls accommodating pipes, drains, and variously shaped housings for underwater lighting, pool skimming appliances, and related structure. It has been found that the concrete does not always adhere to the surface of these structures, but tends to slump away during curing. Water may thereafter seep along the surface of the structure into or through and behind the wall, causing erosion and other damage to the pool. This problem is particularly troublesome with PVC pipe and housings of other polymeric material which are now widely used in such installations because of their low cost and high durability.

In the past, such leaks have been attended to, for instance, by packing the spaces where the leak occurs with an appropriate material. By the time a leak is recognized and packed, significant damage to the cast structure or its immediate environment may have occurred. Furthermore, this type of packing is difficult to install and is often only a temporary solution to the problem. Metallic fittings disposed in tight-fitting engagement about pipes have been tried in an effort to solve this problem. However, casting the wall about such fittings has not succeeded in preventing formation of leaks.

It is an object of this invention to provide a device and method for forming a liquid-tight seal between the exterior surface of a structure and the concrete or other substance in which the structure is embedded. Another object is to provide a liquid-tight seal which is both simple and inexpensive to install and manufacture. Still another object is to provide a convenient method of locating and maintaining the location of pipes, housings, and other structures which are to be embedded in castings, during pouring or spraying of the curable composition about the structure. These and other objects of the invention will be apparent from the description, drawing, and claims which follow.

SUMMARY OF THE INVENTION

A method and device have now been discovered which can provide a liquid-tight seal between a structure and a casting of concrete or other cured cement-like mixture. The method and device are particularly useful for water piping in swimming pool construction. The word "structure" as used herein, is intended to refer generically to conduits, pipes, housings for lighting, appliances or other fixtures, circulation ports, drains, skimmers, and other at least partially hollow devices designed for incorporation into, or for installation through or partially through, a casting such as a wall, floor, bulkhead, dam, or the like.

The method of the invention involves the use of a foamed polymeric, optionally slightly resilient, water-impervious sealing element disposed in adhesive contact with the exterior surface of the structure. The structure section with the adhered foamed polymeric sealing element is set up in a form, and the concrete is then cast in the form about and in contact with both the conduit and the exterior surface of the foamed polymer by pouring or spraying. Curing of the concrete results in the formation of a water-tight bond between the foamed polymeric material and the concrete.

The device of the invention consists of a hollow structure having a foamed polymeric sealing element adhesively bonded to and projecting outwardly from its exterior surface.

In preferred embodiments, the foamed polymeric material comprises a closed-cell foam comprising a non water-absorptive material such as polyethylene or polyvinyl chloride. It is further preferred that the foam polymeric material consist of a relatively dense pad or block defining a central opening for receiving in interfitting engagement the exterior shape of the pipe, housing, etc. to be disposed in the casting. Preferably, the foam is cut to shape from a larger piece of stock, and has an irregular or textured surface comprising exposed cut cells. This type of surface is believed to contribute to the formation of a water-tight seal. The invention permits excellent, lasting seals to be formed between concrete or gunnite and the exterior surface of, for example, polyvinyl chloride piping.

Use of the sealing element of the invention also permits the contractor to locate a structure to be disposed in the casting more accurately and securely such that its position is maintained during casting and curing. Thus, for example, a drain and its surface fitting, a directional flow outlet, or other appliance may be situated so that post casting work is unnecessary. This can be accomplished by fastening the sealing element to reinforcing rods or other fixed elements in the form with wires or the like so as to maintain the position of the structure during, for example, spray casting.

For a fuller understanding of the nature, objects, and features of the invention, reference should be made to the following detailed description and accompanying drawings.

BRIEF DESCRIPTION OF THE DRAWINGS

Like reference characters in the respective drawn figures indicate corresponding parts.

DESCRIPTION

The invention features a method and device for providing a liquid-tight seal between a hollow structure and a cured concrete or other cement-like mixture in which the structure is embedded. The invention is particularly useful in the construction of swimming pools or similar water-holding cast vessels. The method and device of the invention prevent the formation, during curing of the casting and afterwards, of a water passage between the concrete and the hollow structure, and provide a liquid-tight seal at the interface of the cured concrete and the structure. Water is thus prevented from leaking through the casting along the outside surface of the conduit, pipe, housing, etc.

According to the method of the invention, a foamed polymeric sealing element is adhesively bonded to an exterior section of a hollow structure. The section is disposed in a construction form, and concrete, gunnite, or other mixture including portland or another type of curable cement, is then poured, sprayed, or "shot" into the form about the structure in contact with its exterior surface and with the surface of the sealing element. After curing, the sealing element is encapsulated by the concrete to result in a liquid-tight seal. The method works well with polyvinyl chloride and other types of plastic pipe and housings. Structures of other material such as metals including cast iron, copper, brass, and lead, may also be sealed, as may flexible plastic tubing, phenolic tubing, and the like.

The foamed polymeric element optionally may be a resilient foam, and is most preferably a closed-cell polyethylene foam such as ETHAFOAM available from the Dow Chemical Company. Foams having a density greater than two pounds per cubic foot are preferred. Good results with 1.5 inch plastic pipe have been achieved with a six pound density foam. Higher density foam is preferred for larger seals. Closed cell foams are preferred, as are foams made from hydrophobic polymers, as absorption of water by the sealing element should be avoided. The foamed plastic material comprising the sealing element also should be as inert as possible to the physical and chemical environment of the concrete wall.

The foamed plastic element is adhered to a section of the exterior surface of the pipe, housing, or other structure potentially by heat sealing, but preferably with an adhesive which is water-insoluble after curing, to form a liquid-tight bond with the structure's outside surface.

It has been found that a cut cell, textured surface of the foamed material seals well with concrete and gunnite. For this reason, the sealing element is preferably fabricated from a larger piece of foam plastic by sawing or otherwise shaping the raw stock.

Figure 1A:
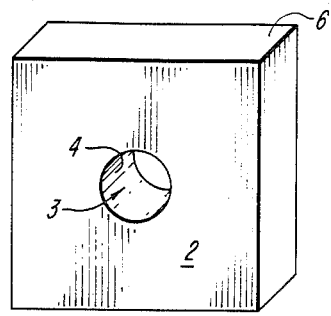
FIGS. 1A through 1D are illustrations of various exemplary foamed polymeric sealing elements comprising preferred embodiments of the invention.

Turning to the drawing, FIGS. 1A–1D illustrate various exemplary forms of the sealing element of the invention. As shown, each of the sealing elements take the form of a block or pad 2 defining one or more circular openings 3 having an interior surface 4. The sealing element 2 includes edge surfaces 6 which present a cut cell surface to promote formation of a water-tight seal between the concrete and the foamed polymeric material. The opening 3 is of a size substantially corresponding to, the outside dimensions of the structure to be sealed, e.g., a pipe 10, so that the pipe may be urged therethrough to form a liquid-tight seal 5 with the interior wall 4 (see FIG. 2 and 3). Before positioning element 2 about pipe 10, adhesive is applied, preferably to both surface 4 and surface 11 to produce a liquid tight seal 5.

Figure 1B:
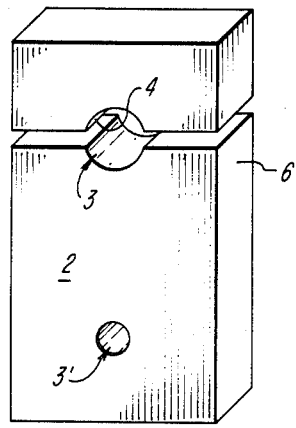
Figure 1C:
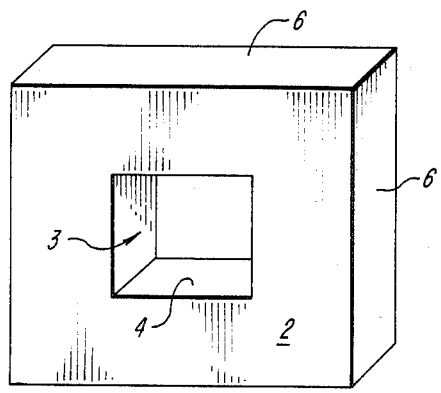
Figure 1D:
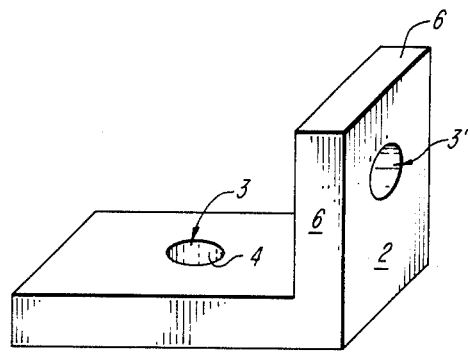
Figure 2:
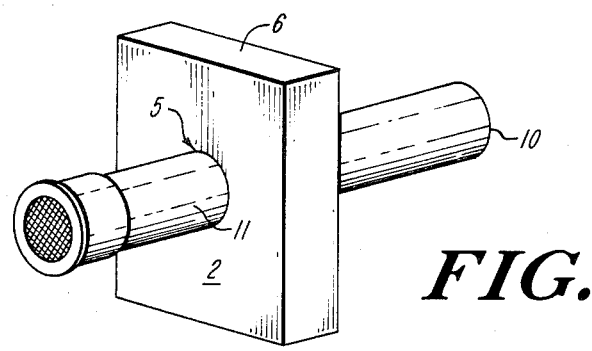
FIG. 2 is an illustration of the element of FIG. 1A having a section of pipe engaged with the sealing element.

FIG. 1B illustrates a sealing element designed to seal two conduits which will pass through opening 3 and 3', respectively. When the conduit is larger in cross-section in portions of its length, the sealing element may take a two-part form also as illustrated in FIG. 1B. In use, the parts are adhered together about the conduit. The sealing element may also take various specialized shapes, one of which is shown, for example, in FIG. 1D, as may be required in particular situations such as in sealing orthogonal pipes servicing a sump or drain. The sealing element of FIG. 1C may be used, for example, to seal about a pool skimmer.

It should be appreciated that the sealing element may take a variety of forms. A suitable element for use with a 1.5 inch polyvinyl chloride pipe (e.g., as shown in FIG. 1A) may be made from a six-pound density foam having a length and width of 6 inches and a thickness of 1 inch. The centrally located circular opening is preferably 1.860 inches in diameter.

The dimensions of the sealing element of course can vary according to the size and cross-sectional shape of the hollow structure and to accomodate other requirements. There is no requirement that sealing element 2 be generally square or rectangular as illustrated. It may take any shape provided it projects outwardly from the surface 11 of conduit 10, preferably at least two to three inches, or a distance at least equal to the diameter of the conduit up to about a three inch diameter. Larger structures preferably have at least three inches of foam on all sides.

To bond the exterior surface 11 of the conduit 10 to the inner surface 4 of the circular opening 3, any adhesive may be used which is water insoluble when set. Preferred are the conventional, typically solvent-based adhesive compositions which are commercially available and are designed for bonding mating sections of PVC pipe, and epoxy adhesives for other materials including ferrous and non ferrous metals.

Figure 3:
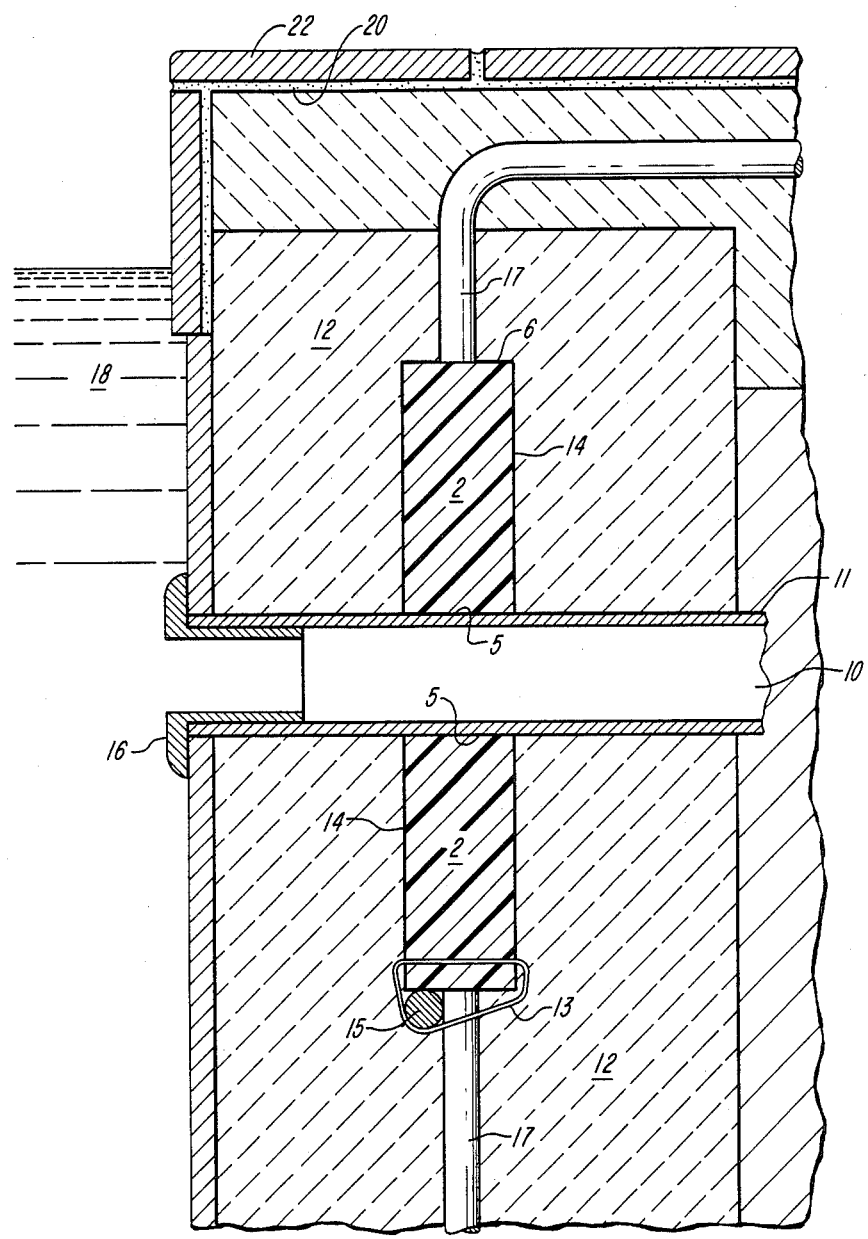
FIG. 3 is a cross-sectional illustration of the foamed polymeric sealing element adhesively bonded to a length of pipe and embedded in a reinforced, cured concrete pool wall.

The conduit section with the foamed polymeric sealing element 2 bonded thereto (see FIG. 2) is then placed in a construction form, and concrete or another cement-based curable mixture is poured or sprayed into the form and cast about and in contact with a portion of the conduit 10 and the entirety of the exposed surface of element 2. The casting is then completed conventionally by, for example, applying plaster 20 and ceramic tile 22, and installing surface fitting 16. As shown in FIG. 3, after curing, the pipe 10 with the foamed polymeric material 2 adhesively bonded thereto is completely embedded within the concrete pool side wall 12. Preferably, the interior side wall 16 of the pool and the sealing element 2 are disposed generally in parallel.

Use of a sealing element in accordance with the invention has advantages in positioning and maintaining the position during curing and casting of structures to be disposed in the concrete. Twist ties, other wires, cord, or clips, may be used to fasten the sealing element to reinforcing rods or other fixed elements such that the position of the pipe or housing remains static during casting. See, e.g., wire 13 disposed about reinforcing rods 15 and 17 in the cross-sectional view of a completed seal shown in FIG. 3. This feature of the sealing method of the invention saves labor, as it is often not required to chip concrete out from about a pipe so as to accomodate a surface fitting (e.g., 16 in FIG. 3) prior to plastering or other interior finishing.

Concrete has a slight adhesion to the foamed plastic material which, together with the locking action caused by curing of the cement mix about the element 2 and in intimate contact with the irregularities of surface 6, is sufficient to produce an excellent water-tight seal. It is hypothesized that, in poured wall structures, the hydrostatic pressure of the fluid cement mix may slightly compress the sealing element as the mix cures, and may urge the element in sealing contact with the surface of conduit 10 and with the concrete interface 14. Thus, when the wall 12 is cured, element 2 remains in compression, forming an effective barrier to water passage along the surface 11 of the conduit 10. However, walls formed by spraying or "shooting" a cement composition into place are also effectively sealed, and as noted above, the sealing element 2 can also have advantages in positioning the embedded structure.

Water or other liquids 18 are prevented from seeping between the pipe and concrete through the wall 12, as the sealing element 2 acts as a dam. Should water seep along the pipe section proximal to the interior surface of the wall, its hydrostatic pressure serves only to compress sealing element 2 against the opposing concrete mass. This liquid-tight seal arrangement thus prevents erosion, loss of water, and damage to the pool structure.

It will thus be seen that the objects set forth above are efficiently obtained. Since certain changes may be made in carrying out the above method and in the device set forth without departing from the scope of the invention, it is intended that all matter contained in the above description and shown in the accompanying drawings shall be interpreted as illustrative, and not in a limiting sense.

The invention may be embodied in other specific forms without departing from the spirit and scope thereof. Accordingly, other embodiments are within the following claims.

What is claimed is:

1. A device for providing a liquid-tight seal between a hollow structure and a cured casting comprising:
   a. a hollow structure; and
   b. a foamed polymeric sealing element adhesively bonded to and extending completely about an exterior surface of said structure along a portion of the length thereof, and extending outwardly from said exterior surface.

2. A device for providing a liquid-tight seal between a hollow structure and a cured concrete casting, comprising:
   a. a hollow structure having an exterior surface; and
   b. a sealing element of non water absorbent, closed-cell foam plastic material defining at least one opening dimensioned to sealingly interfit with the exterior surface of said structure;
   said structure projecting through said opening whereby said opening sealingly engages a portion of the exterior surface thereof.

3. The device of claim 1 wherein said sealing element comprises polyethylene foam and said structure comprises polyvinyl chloride.

4. The device of claim 2 wherein said sealing element comprises polyethylene foam and said structure comprises polyvinyl chloride.

5. The device of claim 1 wherein said sealing element has a textured exterior surface for contact with said casting.

6. The device of claim 2 wherein said sealing element has a textured exterior surface for contact with said casting.

7. The device of claim 2 wherein said sealing element defines a second opening for sealing engagement with a second structure.

8. The device of claim 1 wherein said structure has a non-circular cross section.

9. The device of claim 2 wherein said opening has rectilinear sides.

* * * * *